(No Model.)

R. W. WHITNEY.
CLUTCH.

No. 261,887.  Patented Aug. 1, 1882.

WITNESSES
E. C. Wright
W. E. Donnelly

INVENTOR
Ruel W. Whitney
by Leggett & Leggett
ATTORNEYS

UNITED STATES PATENT OFFICE.

RUEL W. WHITNEY, OF NEW YORK, N. Y., ASSIGNOR TO HIMSELF AND JOHN CROWELL, JR., OF GLENVILLE, OHIO.

CLUTCH.

SPECIFICATION forming part of Letters Patent No. 261,887, dated August 1, 1882.

Application filed March 23, 1882. (No model.)

*To all whom it may concern:*

Be it known that I, RUEL W. WHITNEY, of New York, in the county of New York and State of New York, have invented certain new and useful Improvements in Clutches; and I do hereby declare the following to be a full, clear, and exact description of the invention, such as will enable others skilled in the art to which it pertains to make and use the same.

My invention relates to clutches; and it consists in the peculiar construction of the same, as will be hereinafter fully set forth and claimed..

Figure 1:
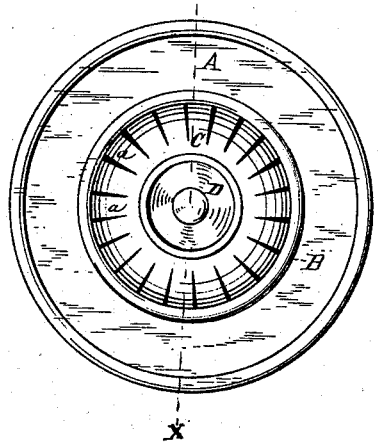
Figure 2:
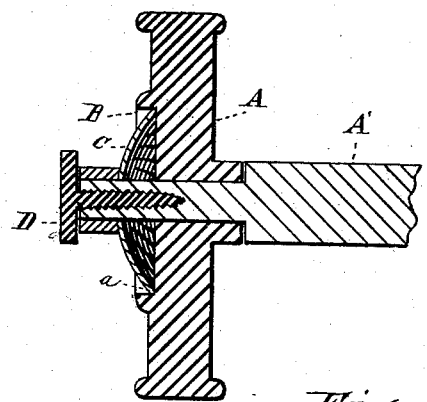
Figure 3:
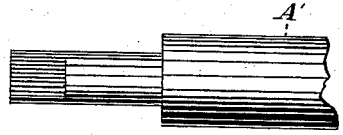

In the drawings, Figure 1 is a plan view of a wheel having my clutch attached. Fig. 2 is a section taken through line $x\ x$, Fig. 1. Fig. 3 is a view showing one manner of forming the end of the shaft to which my clutch may be secured, which will prevent the said clutch from turning when in operation.

A is a wheel or pulley of any suitable construction, which revolves freely on a shaft, A'. This wheel or pulley is provided with a recess, B, into which sets a concavo-convex disk, C, which is secured to the shaft A', and is cut for a short distance from its periphery inward toward its center, thus forming arms $a$. To the number of arms formed I do not limit myself, but prefer to form them as shown in Fig. 1 of the drawings. Cutting the disk C, as aforesaid, allows of the enlargement of the periphery by compressing the center of the disk from the convex side, and causes the outer ends of the arms $a$ to engage with the inner walls of the recess B, which in turn acts to prevent the wheel or pulley A from turning on the shaft A'.

The recess B may be formed in any suitable manner, either by means of an annular flange, as shown in the drawings, Figs. 1 and 2, or by sinking it in the body of the wheel.

The disk C is formed in such a manner that when in its normal position its circumference is slightly smaller than the inner circumference of the recess B. This allows the wheel A to revolve freely on the shaft A' when the disk C is not compressed.

One manner of operating my clutch is shown in the drawings, viz: The wheel or pulley A is first loosely journaled on a shaft, A', with its recessed face outward. The disk C is then placed on the shaft with its concave side facing the recess of the wheel or pulley A. This disk is so secured to the shaft A' that it is free to slide a short distance on the said shaft, and is prevented from revolving around the same, its center being provided with an irregular-shaped hole, into which fits the irregular-shaped end of the shaft A'. A set or thumb screw, D, which is screwed into the end of the shaft A', acts to hold the parts securely on the shaft A', and also acts, when desired, to operate the disk C, as shown more clearly in Fig. 2.

I do not claim this as a face friction or clutch, but a clutch formed by the expansion of the disk from the operation of the screw or other suitable device, said expansion causing a pressure of the ends of the arms of the disk against the inner surface of the recess B.

What I claim is—

1. A clutch composed of a disk made convex on one side, the periphery of said disk being divided, in combination with a recess formed in the face of a wheel or pulley, all operating substantially as and for the purpose shown and described.

2. A clutch composed of a concavo-convex disk, having its periphery divided into one or more parts, whereby the circumference of said disk is adapted to be enlarged, and thus engage with the inner wall of a recess formed on a wheel or pulley, substantially as and for the purpose shown and described.

In testimony whereof I have signed my name to this specification in the presence of two subscribing witnesses.

RUEL W. WHITNEY.

Witnesses:
   A. P. SMITH,
   JOHS. BRACKEY.